L. A. Aspinwall,
Potato Planter.

No. 97,339.    Patented Nov. 30, 1869.

WITNESSES.
John Van Dyck
Jacob G. Sanders

INVENTOR.
L. Aug! Aspinwall

United States Patent Office.

L. AUGUSTUS ASPINWALL, OF ALBANY, NEW YORK.

Letters Patent No. 97,339, dated November 30, 1869.

IMPROVEMENT IN MACHINE FOR PLANTING POTATOES.

The Schedule referred to in these Letters Patent and making part of the same

*To all whom it may concern:*

Be it known that I, L. AUGUSTUS ASPINWALL, of the city and county of Albany, and State of New York, have invented a new and useful Improvement on a Machine for Planting Potatoes; and I do hereby declare that the following is a full and exact description of my invention, reference being had to the accompanying drawings, and the letters of reference marked thereon.

Figure 1:
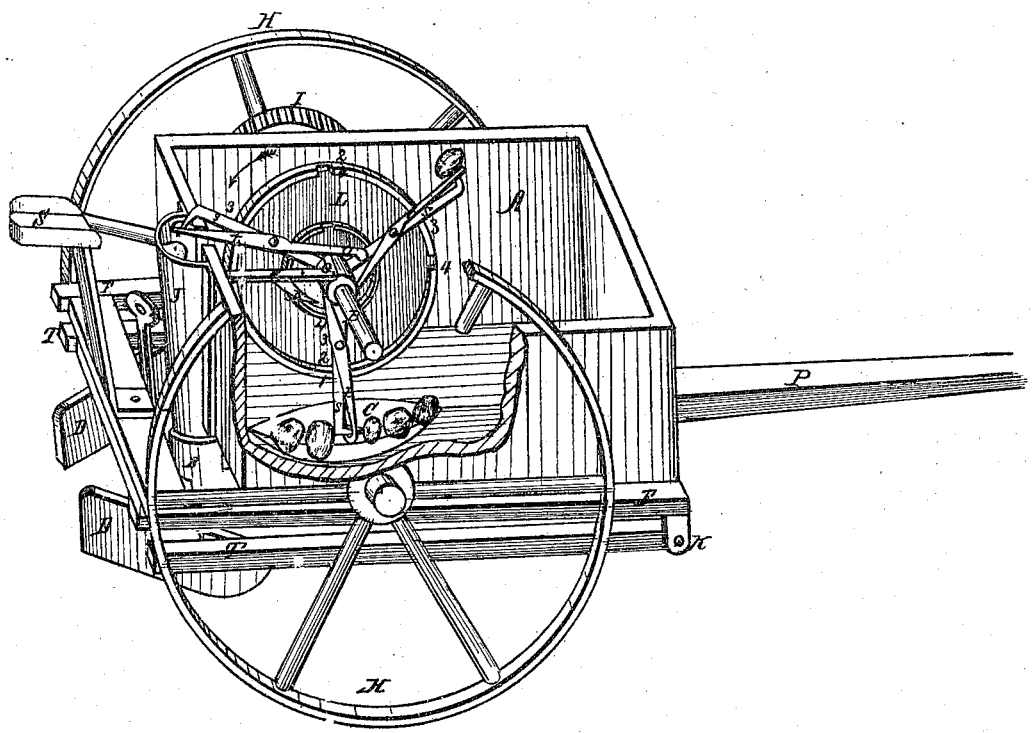
Figure 2:
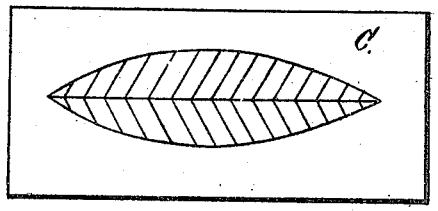

Figure 1 represents a perspective view.
Figure 2 represents the concave.

The machine, as seen in figs. 1 and 2, is mounted on a pair of drive-wheels, H H, and provided with a large hopper, A, for the reception of the seed potatoes.

The wheel H upon the driver gives motion to the pinion I, causing the disk L to revolve.

This disk, as seen in fig. 1, is provided with a spear, s, trip t t, and the device M, for operating the trip.

C, fig. 2, represents the concave, which may also be seen in fig. 1, at the bottom of the hopper A, below the disk L, on the shaft B.

J is the conductor for receiving the potato and guiding it to the plow.

P is the pole.
S is the seat.
E is the plow.
D D are the coverers, which are attached to the frame T T and pivoted to the main frame F F at the point K.

The spear s, although not new in itself, is intended for picking the potatoes from the hopper and depositing them in the furrow made by the plow. The point of the spear moves closely in the concave, (where the potatoes form in a line,) enters the seed, and carries it around out of the top of the hopper.

The trip t t is to prevent the potato from being driven too far upon the spear, and to remove the same from it.

The disk, upon which the trip is fastened, moves in the direction of the dart, which causes the trip to strike the device M at the point o at r, which discharges the potato in the furrow.

It is then driven back by the arm N, while entering the hopper below, and again receives a potato.

The distance apart which the potatoes are dropped is regulated by the number of spears, as seen in fig. 1, where they may be increased to 4, as 1, 2 2, 3 3 3, 4 4 4 4.

The concave is made V-shaped, in order that the potatoes may roll directly in the way of the spears, thus insuring the chance of catching one each time.

The object of swinging the plow and coverers is, that the depth may be easily regulated, and also raised, to facilitate turning at the ends of the rows, which is a gain over the method of raising the whole machine by means of handles.

The operation of the machine is as follows:

The hopper being provided with potatoes, arrange themselves in a row in the concave below, when the spear or spears are made to revolve by means of the gearing, entering the hopper on its lower side, pierces the potato, carries it out of the top of the hopper, where it is removed by the trip and conducted to the furrow formed by the plow, and covered by the coverers.

What I claim as my invention, and desire to secure by Letters Patent, is—

1. A spear or spears, provided with trips.
2. Operating the trips, substantially as described.
3. The V-shaped concave C, constructed and used in the manner described.
4. Swinging the plow and coverers from the main frame, substantially as described and for the purpose set forth.

L. AUGS. ASPINWALL.

Witnesses:
JOHN VAN DYCK.
JACOB G. SANDERS.